United States Patent
Hanson

(10) Patent No.: US 9,488,466 B2
(45) Date of Patent: Nov. 8, 2016

(54) SYSTEM AND METHOD FOR TRACKING OBJECTS

(75) Inventor: Nigel Peter Hanson, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/447,538

(22) Filed: Apr. 16, 2012

(65) Prior Publication Data

US 2012/0199648 A1    Aug. 9, 2012

Related U.S. Application Data

(63) Continuation-in-part of application No. 12/566,093, filed on Sep. 24, 2009, now abandoned.

(51) Int. Cl.
   *G01B 11/00* (2006.01)
   *G01C 21/20* (2006.01)
   *G06K 17/00* (2006.01)

(52) U.S. Cl.
   CPC ............. *G01B 11/002* (2013.01); *G01C 21/20* (2013.01); *G06K 17/00* (2013.01); *G06K 2017/0045* (2013.01)

(58) Field of Classification Search
   CPC ................ G01B 11/002; G06K 2017/0045
   USPC .................................................. 235/462.08
   See application file for complete search history.

(56) References Cited

U.S. PATENT DOCUMENTS

| | | | | |
|---|---|---|---|---|
| 2005/0052281 A1* | 3/2005 | Bann | ......................... | 340/539.13 |
| 2006/0184013 A1* | 8/2006 | Emanuel et al. | ............. | 600/426 |
| 2006/0219780 A1* | 10/2006 | Swartz et al. | ................ | 235/383 |
| 2007/0155401 A1* | 7/2007 | Ward | .................... | H04W 64/00 455/456.1 |
| 2007/0268138 A1* | 11/2007 | Chung | .................. | G01S 5/0018 340/572.1 |
| 2008/0154415 A1* | 6/2008 | Salour | .............. | G05B 19/41865 700/108 |
| 2008/0266097 A1* | 10/2008 | Lee | .......................... | 340/572.1 |
| 2010/0219953 A1* | 9/2010 | Bloy | ..................... | G01S 13/003 340/572.1 |
| 2012/0229262 A1 | 9/2012 | Amor | | |

\* cited by examiner

*Primary Examiner* — Toan Ly
(74) *Attorney, Agent, or Firm* — Kilpatrick Townsend & Stockton LLP

(57) ABSTRACT

A system, device and methods are provided for tracking objects, such as shipping containers and other movable items. In one embodiment, a method includes detecting an object based on detection of an object identification tag and detecting a marker during transport of the object, wherein detection of the marker includes determining location data of the marker. The method may further include storing position data for the object based on the location data of the marker, and outputting the position data for the object.

32 Claims, 7 Drawing Sheets

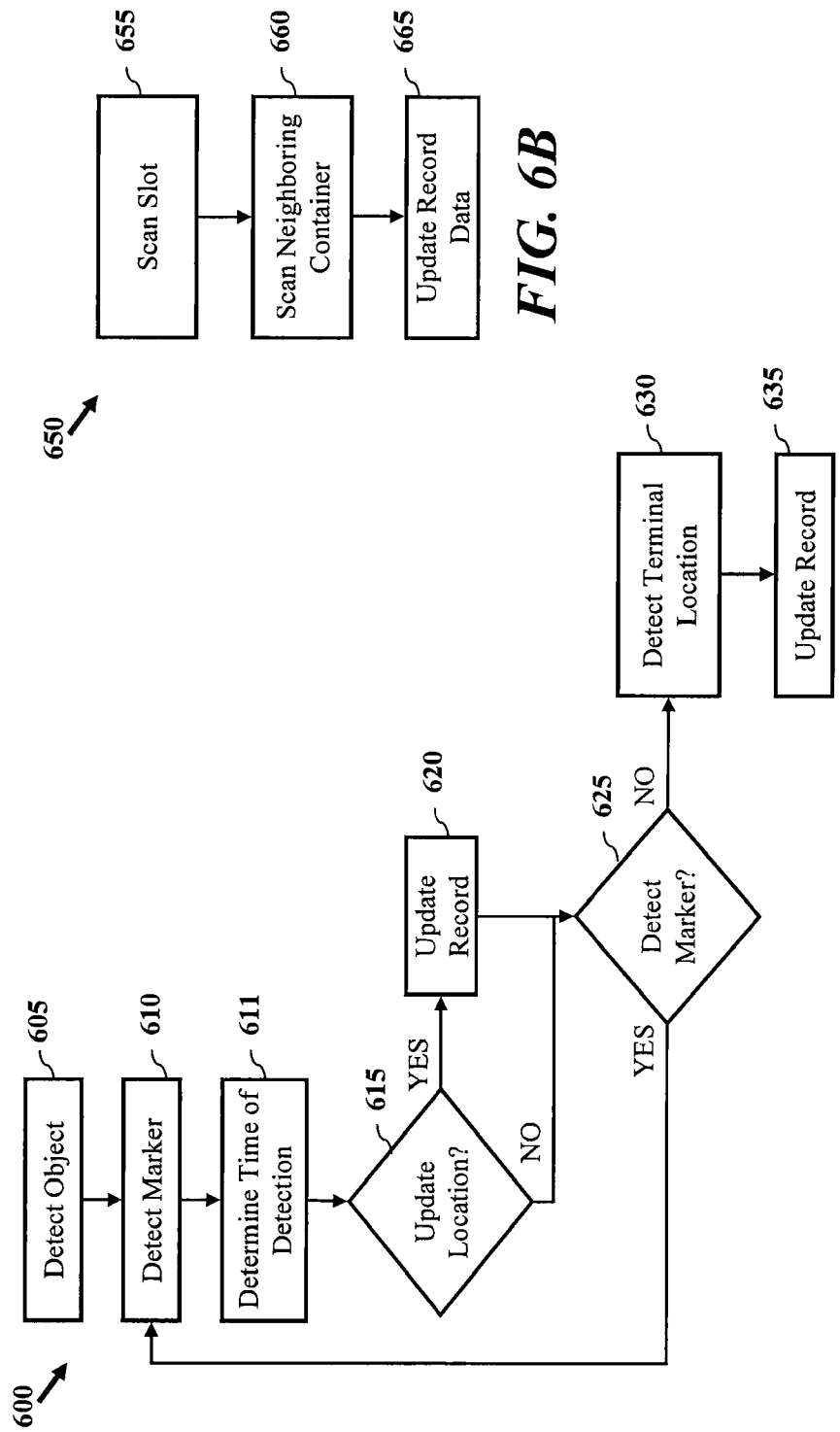

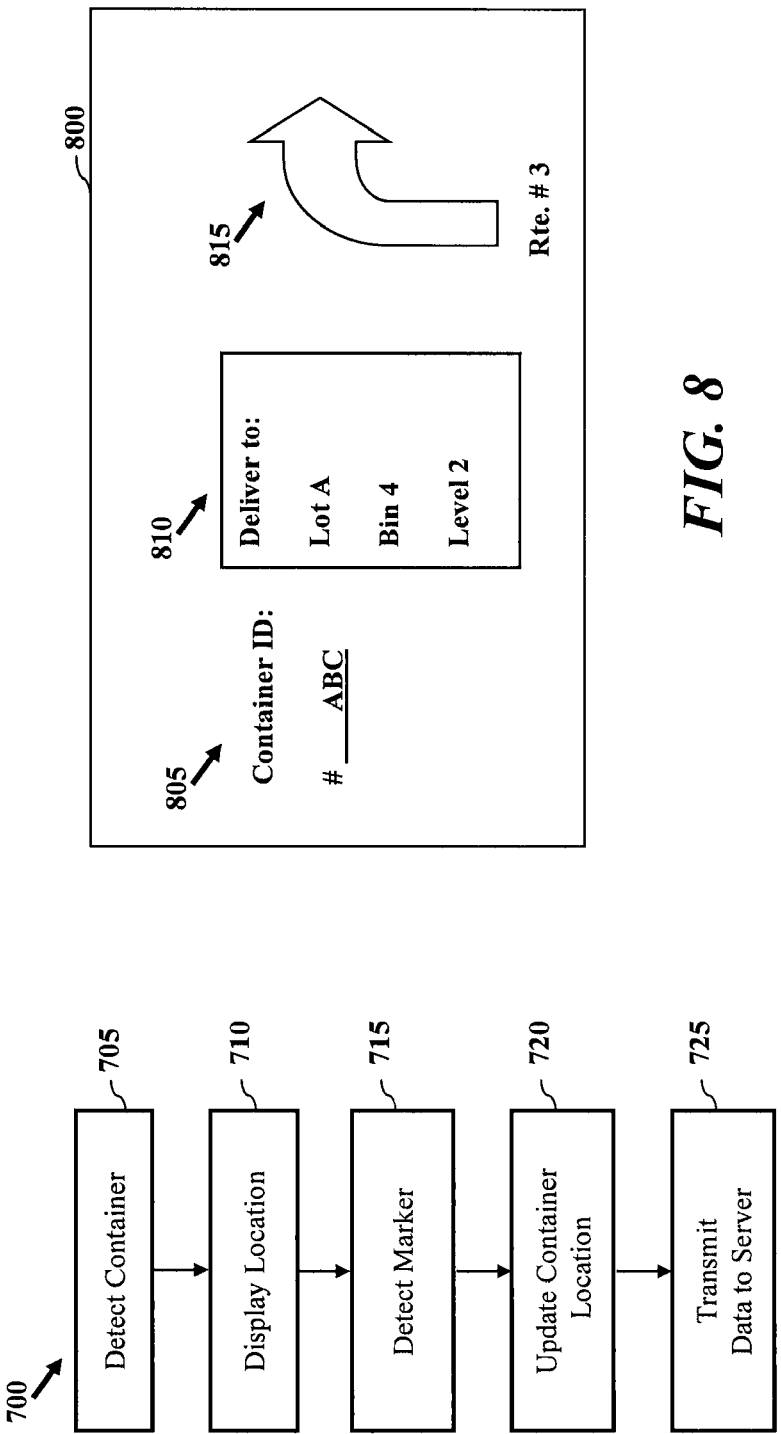

SYSTEM AND METHOD FOR TRACKING OBJECTS

CROSS-REFERENCE TO RELATED APPLICATION

The present application is a continuation in part of U.S. patent application Ser. No. 12/566,093 entitled "Method and Apparatus for Barcode and Position Detection," the disclosure of which is hereby incorporated by reference in its entirety.

FIELD

The present disclosure relates generally to systems and devices for determining position and tracking objects, and more particularly to a system and methods for tracking objects based on detection of markers.

BACKGROUND

A longstanding problem associated with tracking shipping containers is the ability to determine position of containers during loading and unloading of containers from transportation devices. One proposed approach is to utilize global positioning data to track location of containers. A major drawback of using global positioning systems to track shipping containers is multi-path error. When a global positioning signal does not reach the ground, errors may result in a determined position of a container. In addition, positioning signals may bounce off various local obstructions before the signal is received. As a result, location and position of a shipping container using conventional global positioning methods may not be accurate. In some cases, global positioning systems may be inoperable due to obstructions of timing signals. Thus, although global positioning systems provide uses in many applications, conventional positioning systems do not allow for tracking containers. Similar drawbacks may be present when attempting to track other objects.

Thus, there is a need and a desire in the art for a method and apparatus for tracking containers, and objects in general.

BRIEF SUMMARY OF THE EMBODIMENTS

Disclosed and claimed herein are a system and methods for tracking an object. In one embodiment, a method tracking an object includes detecting the object, by a device, based on detection of an object identification tag, and detecting a marker during transport of the object, wherein detection of the marker includes determining location data of the marker. The method further includes storing, by the device, position data for the object based on the location data of the marker, and outputting, by the device, the position data for the object.

Another embodiment is directed to a device for object tracking, the device including a display, a detection module configured to detect a marker during transport of an object, and a processor coupled to the display and the detection module. The processor is configured to receive data identifying an object, by a device, based on detection of an object identification tag, determine location data of the marker based on marker data for the object, control storage of position data for the object based on the location data of the marker, and control output of position data for the object.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 6A-6B depict processes for tracking an object according to one or more embodiments;

FIG. 7 depicts a process for outputting container location information according to one or more embodiments;

FIG. 8 depicts a graphical representation of an exemplary user interface of a control device according to one or more embodiments.

DETAILED DESCRIPTION OF THE EXEMPLARY EMBODIMENTS

Overview and Terminology

Figure 1:
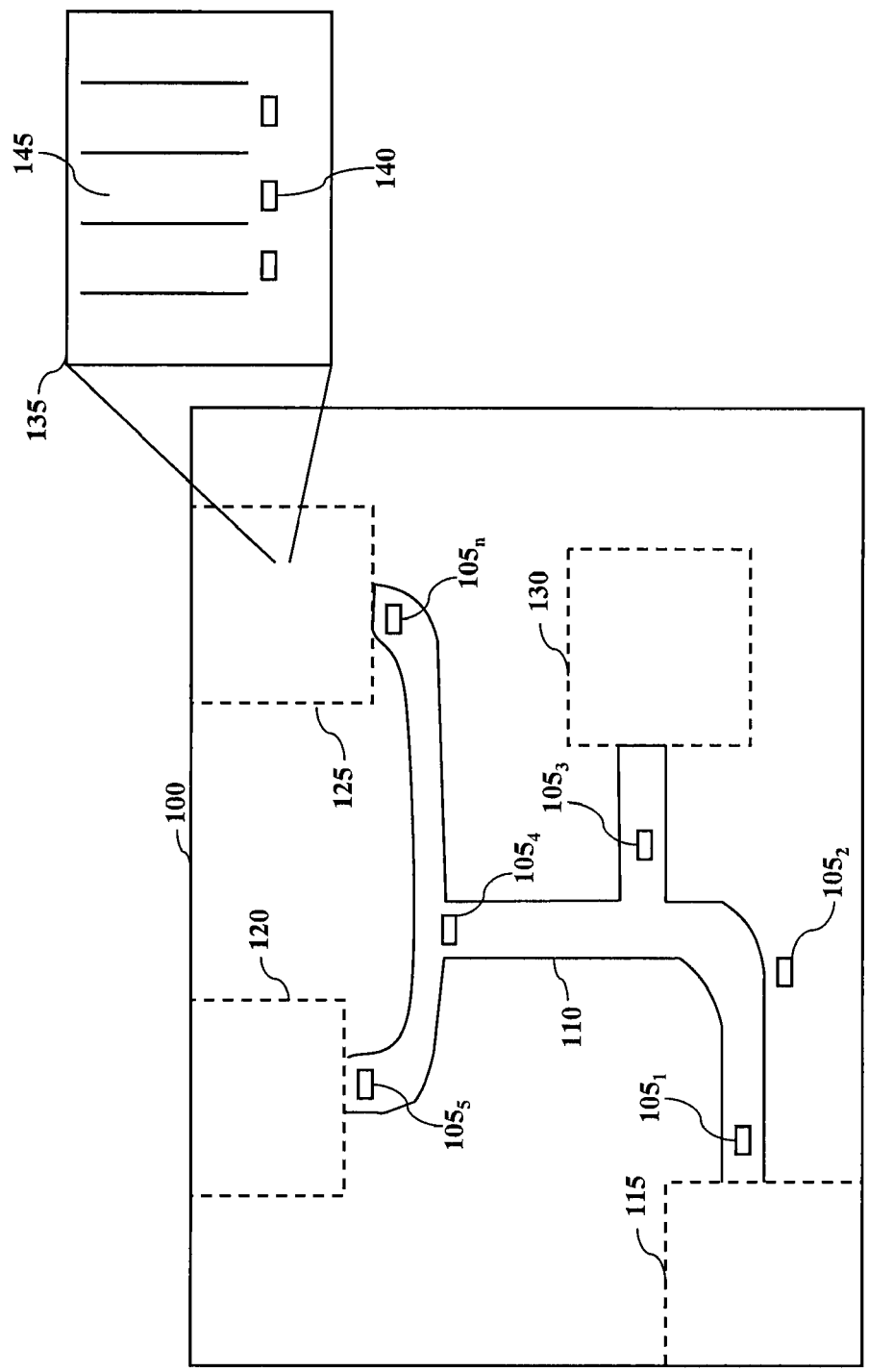
FIG. 1 depicts a graphical representation of a plurality of markers according to one or more embodiments.

One aspect of the disclosure relates to tracking objects based on detection of one or more markers. A system and methods are provided for detecting one or more markers for determining location data of an object. According to one embodiment, location data determined for the object may be employed for one or more of transport, scheduling, mapping and routing of an object. An object, as used herein, includes one or more of a container, shipping container, rail car, tractor trailer, car hauler, transport container, vehicle, item for transport, and movable item.

As used herein, a marker may include one or more of a barcode target and radio frequency identification (RFID). In one embodiment, markers may be detected based on short range wireless detection of an optical target, such as a two-dimensional barcode, matrix array or encoded pattern. According to another embodiment, a marker may be detected based on radio frequency identification (RFID). By way of example, markers may include one or more of passive and active tags. Each marker may be associated with a fixed physical location. For example, a marker may be positioned in a fixed and static location. A marker may similarly be associated with a movable object. In certain embodiments, a marker may also be associated with objects, such as shipping containers and transport devices. A marker may be associated with objects by fixing or coupling the marker to the object. Associating of the marker to the object may include encoding data for the object in the marker. Each marker may be configured to store data, such as identification, location data, and/or a network location.

In another embodiment, a system is provided for determining and storing location data associated with one or more objects. The system may allow for a device to detect one or more markers and control operation of a machine, such as a transport device, based on detection of a marker. The system may additionally be configured for tracking one or more shipping objects. In addition, the system may be configured to allow for sharing of object data via a data communication network.

Another embodiment is directed to detecting, identifying and tracking containers, such as shipping containers, during one or more of transport, storage, loading, unloading and container processing. A method for container tracking includes detecting one or more markers to determine location data for a container. Location data determined for the container may be employed for one or more of transport, scheduling, mapping and routing the container. A system is provided for tracking one or more containers, including shipping containers. In addition, the system may be configured to allow for sharing of shipping container data via a data communication network.

Another aspect of the disclosure is directed to presenting a user interface based on detection of one or more markers. In one embodiment, detection of a marker may be employed to update location data for a container and present information to a user for transport of the container.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a non-transitory medium, etc.

Exemplary Embodiments

Referring now to the figures, FIG. 1 depicts a graphical representation of a plurality of markers according to one or more embodiments. FIG. 1 depicts area 100, which may be a storage yard, storage facility, or area in general for storage and/or processing of objects, such as containers. According to one embodiment, one or more markers, depicted as $105_{1-n}$, within a particular area may be detected for positioning, tracking, routing, scheduling and/or mapping location of an object. A marker, such as markers $105_{1-n}$, can be encoded with the physical location of the marker. In one embodiment, markers $105_{1-n}$ have a fixed or static position within area 100. Markers $105_{1-n}$ may be detected by a device based on one or more or RFID and optical detection. Based on detection of a marker, such as marker $105_1$ for example, via RFID and/or optical detection, position data of marker $105_1$ can be associated with a particular container. For example, the position data may be stored in a database and/or data record for the container. According to another embodiment, detection of a marker includes storing the time of detection of the marker. Similarly to position data determined from a marker, time of detection data for the marker may be stored in a database and/or entered into a data record for a container.

According to one embodiment, when objects are containers, markers $105_{1-n}$ may be detected by a device for transporting the containers. For example, markers $105_{1-n}$ may be detected by one or more of a devices for transporting a container, such as a straddle carrier, lift device, crane, etc. Based on detection of one or more markers, such as markers $105_{1-n}$, a controller of a device may be configured to modify a route, provide information to an operator of the device, and store location data for the container. As depicted in FIG. 1, area 100 includes path 110 which may be a route or transport path that containers may be processed along.

In one embodiment, markers $105_{1-n}$ can contain information for the actual location of the marker, such as latitude and longitudinal coordinates. Markers $105_{1-n}$ can contain a network address, such as a URL of a web service, that can provide location data for the particular marker. For example in certain embodiments, the network address may include a character string of the network address wherein an identification number of the marker is included in the character string such that a return result of the URL includes data for coordinates of a location.

According to one embodiment, markers $105_{1-n}$ may be positioned along path 110. When markers $105_{1-n}$ are, optical targets, such as barcodes, two-dimensional barcodes, matrix codes or encoded patterns, a device may detect the markers when passing over, near or close to the marker by scanning or optical detection of the optical targets. Markers $105_{1-n}$ may be detected and electronically read by a device when the markers include RFID devices. According to another embodiment, one or more of markers $105_{1-n}$ may be located near path 110, as depicted by marker $105_2$. In yet another embodiment, one or more of markers $105_{1-n}$ may be positioned near the entrance to a sub-area and/or near intersections of a path 110.

In on embodiment markers $105_{1-n}$ can passive markers that can be read by a device, such as a device on a transport machine. Markers $105_{1-n}$ may be scanned by an optical device including a laser scanner or imaging device to detect and decode position data. As a passive marker, markers $105_{1-n}$ may be detected an RFID reader. In another embodiment, markers $105_{1-n}$ may be active devices. For optical scanning, for example, markers $105_{1-n}$ may be read from a display by one or more or optical recognition or laser scanning. When markers $105_{1-n}$ are active RFID devices, a marker may be configured to provide position data and in some cases detect objects traveling relative to the marker. Marker and object data may be collected and stored for object tracking and providing information relative to object movements, such as efficiency, estimated transportation time, etc.

Area 100 additionally includes sub-areas or lots 115, 120, 125 and 130 which may be used to store one or more containers. Sub-areas 115, 120, 125 and 130 of area 100 may be one or more storage areas or transfer points for a container. A detailed view of sub-area 125 is depicted as 135 which includes one or more bays 145 identified each by a marker, such as marker 140. In one embodiment, a device may detect a position of an object based on marker 140, for example. Based on positioning of a container in a bay, such as bay 145, the location data of the container may be updated. In that fashion, tracking of a container may be provided from one sub-area to another within area 100. As will be discussed in more detail below, the device may additionally be configured to detect other containers during placement of a container in a bay, to aide in one or more of transporting, retrieving, scheduling and routing a container.

Although FIG. 1 is described above with reference to a particular area and containers, it should be appreciated that the embodiments described herein may be applied to other forms of tracking and non-container items. For example, the embodiments and methods described here in may be employed for tracking and positioning vehicles, machinery, lumber, raw materials, etc.

One of the benefits of employing markers $105_{1-n}$ may be to reduce and/or eliminate multipath error of global positioning measurements for a container. Another benefit of markers $105_{1-n}$ may be the ability to determine time to access and remove one or more containers, such as shipping containers when many containers are stored in a particular area and/or are stored in a stacked arrangement. Markers $105_{1-n}$ may also be employed to provide feedback and/or control information to a user of a device for transporting containers.

In on embodiment, objects as described herein include one or more of large objects requiring mechanized transport, such as vehicles on carriers, large shipping containers, hauling devices (e.g., tractor trailers), earth moving machinery, etc. It should also be appreciated that objects may refer to carrier systems for processing and delivery of parcels shipping items. In another embodiment, objects can relate to containers of mineral products, material supply, etc. In yet another embodiment, objects can include containers of food and food preparation substances. Transportation of objects may include transport from one location to another location, transport from a carrier device (e.g., transport machinery, shipping vessel, transportation device, etc.) to a storage area, transport within a storage area, and transportation to a parking sport before departing to a more distant destination.

Figure 2:
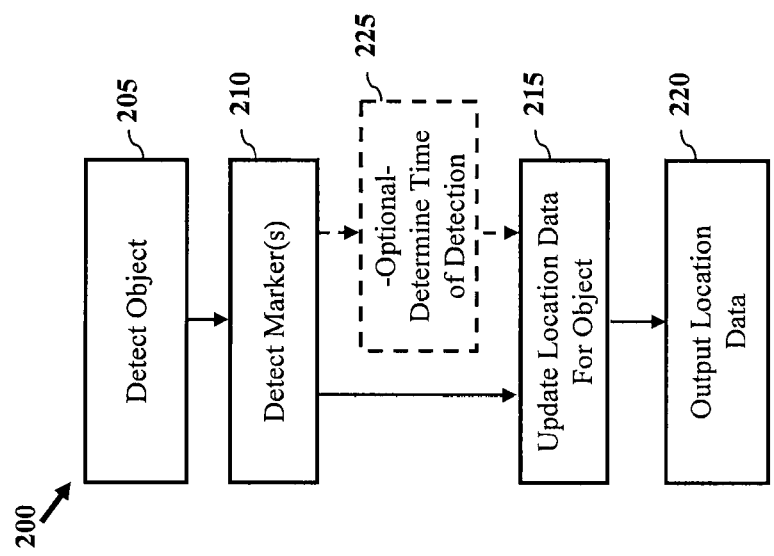
FIG. 2 depicts a process for tracking an object according to one or more embodiments.

Referring now to FIG. 2, a process is depicted for tracking an object, such as a container, according to one or more embodiments. In one embodiment, process 200 may be employed by a machine for transporting a container. According to another embodiment, process 200 may be employed by a control device, such as a control unit having a display. In certain embodiments, process 200 may be performed by an application, such as one or more of an application for tracking, scheduling, mapping and storage of containers.

Process 200 may be initiated by detecting a container at block 205. According to one embodiment, a container may be detected at block 205 by wireless detection. Wireless detection may include one or more of detecting a barcode target on the container, such as one or more of a barcode, two-dimensional barcode, matrix code, and an encoded pattern. According to another embodiment, a container may be detected by on detection of an RFID tag associated with the container. Transportation machinery may detect a container during one or more stages of shipping container transport, such as pickup of the container by the transportation machinery, during transport and drop off.

At block 210, a marker may be detected. In one embodiment, the marker may be detected during transport of a container. A marker may be associated with one or more fixed positions of locations, and in some instances may be associated with a movable object. The marker may be located in a static position, such as on or near a path or roadway, or on a sign or other post. The marker can be encoded to include a physical location, such as the marker location. In that fashion, the current position of the container may be detected based on detection of the marker at block 210. In one embodiment, detecting a marker includes detecting at least one of a barcode target and a RFID. According to another embodiment, detecting a marker includes detecting a marker located on one or more of the ground, roadway, a pathway, post or structure in the storage facility.

In one embodiment, markers detected by process 200 are passive markers. In other embodiments, markers detected in process 200 include active markers. In certain embodiments, objects, such as containers may include an RFID tag and/or optical reader, such as a barcode reader for detecting markers. The container may be configured to detect markers during transport of the object, such as markers on a roadway or street sign. The container may additionally provide marker data and time of detection data to a device or database, such as a network service, for storage of container data.

Detecting a marker at block 210 may be based on optical detection of the device or scanning of an area near transportation machinery. For example, in one embodiment, a device may periodically or continuously search for one or more markers. In that fashion, traveling over or by a marker can trigger detection of the marker.

At block 215, process 200 may update the location of the container based on a detected marker. According to one embodiment, location data associated with the marker, which may be extracted during detection of the marker, may be stored in an electronic record for the container. The electronic record may be stored by the device and/or transmitted to one or more other devices including a network accessible server. Updating the location of the object may include creating a data record and/or modifying location data stored in the data record for the container. Updating the location data at block 215 may additionally include storing the time of detection of the marker.

At block 220, location data for the object may be output. In one embodiment, a user interface of the controller may display location data for the marker. In another embodiment, outputting of the location data for the container may include transmitting the location data to a server. Process 200 may additionally include updating a display of a controller of the device based on location data for the container. For example, the display of a device may be updated for one or more of scheduling, mapping, and routing a container.

According to another embodiment, process 200 may include detecting one or more additional containers during transport of a container or when transport has concluded. Detection of the additional containers may aide in identifying and locating the transported container during later retrieval. Another benefit may be the ability to transmit location data for a container to another transportation device. In that fashion, transportation machinery may determine placement and/or processing of a container.

Process 200 may optionally include determining time of detection of a marker. As depicted in FIG. 2, process 200 includes optional block 225 for detecting time of detection of a marker. In certain embodiments, determining time of detection of a marker may be performed at block 210 with detection of a marker. In certain embodiments, determining time of detection at block 225 may be in addition to detection of markers at block 210.

In certain embodiments, determining a location of a container may include determining one or more position measurements based on global positioning data. By way of example, the device may interoperate global positioning data with data obtained from one or more markers. In that fashion, multi-path error may be reduced and/or eliminated.

Figure 3:
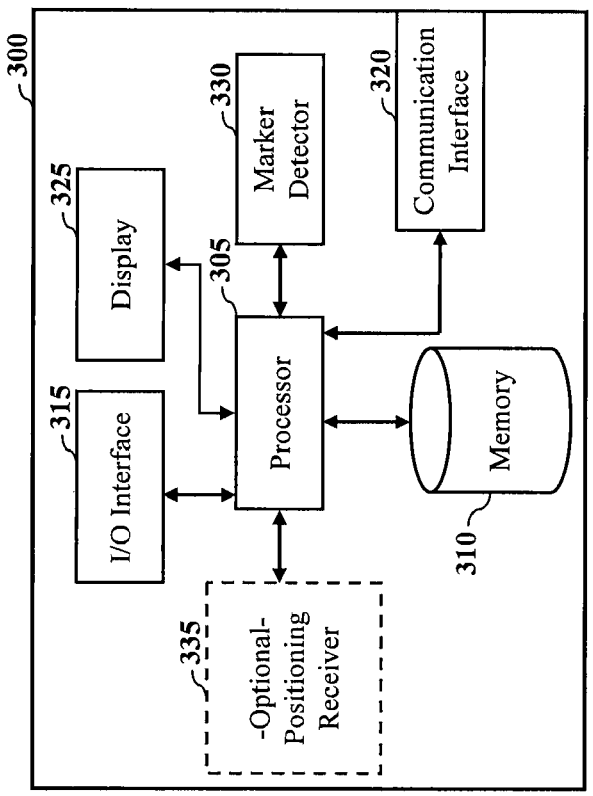
FIG. 3 depicts a simplified block diagram of a device according to one embodiment.

Referring now to FIG. 3, a simplified block diagram is depicted of a device according to one or more embodiments. Device 300 may relate to one or more of a control device, machinery control unit, computing device, or mobile electronic device in general. In certain embodiments, device 300 may be configured to detect one or more of containers and markers. According to another embodiment, device 300 may be employed for tracking one or more containers. In yet another embodiment, device 300 may be included with a vehicle and/or machinery for transporting containers, such as shipping containers.

Device 300 may be configured to interoperate with or operate independently from a machine for transporting containers. Device 300 includes processor 305, memory 310, input/output (I/O) interface 315, communication interface 320 and display 325. Device 300 may additionally include one or more detectors, such as marker detector 330. In one embodiment, marker detector 330 may be configured to detect markers by short range communication, such as detection of an RFID marker. In another embodiment, marker detector 330 may be configured to detect markers by one or more of optical detection, imaging, and laser scanning. For example, marker detector 330 may include an imaging device (e.g., digital camera). In other embodiments, marker detector 330 may include an RFID reader and optical detector. Marker detector 330 may be configured to capture/read one or more areas surrounding a device, such as one or more particular areas surrounding a transport device to continuously search for markers. Device 300 may then process detected optical data and or received RF signals to determine if a marker has been detected. In other embodiments, marker detector 330 may scan or search for markers periodically, such as detection every half second, detection on the order of one or more seconds, and detection when instructed by a user or processor of device 300. Device 300 may optionally include positioning receiver 335. Elements of device 300 may be configured to communicate and interoperate with processor 305 by a communication bus.

Processor 305 may be configured to control operation of device 300 based on one or more computer executable instructions stored in memory 310. In one embodiment, processor 305 may be configured to process and control operation based on one or more detected marks. Memory 310 may relate to one of RAM and ROM memories and may be configured to store one or more files, and computer executable instructions for operation of device 300. Although depicted as a single memory unit, memory 310 may relate to one or more of internal device memory and removable memory. Memory 310 may store one or more container identifiers and location data for one or more containers. Memory 310 may store position data for objects, detected markers associated with an object, time of detection for detected markers and other data for one or more objects.

Input output (I/O) interface 315 may be configured to output data and/or commands to one or more output devices. According to one embodiment, I/O interface 315 may be configured to receive one or more user commands. I/O interface 315 may include one or more buttons to control operation of device 300 including controlling selection of content for display and controlling operation of device 300. Input buttons of I/O interface 315 may include one or more buttons for user input, such as a numerical keypad, menu controls, pointing device, track ball, mode selection buttons, etc. Buttons of I/O interface 315 may include hard and soft buttons, wherein functionality of the soft buttons may be based on one or more applications running on device 300.

Communication interface 320 may include one or more elements for device 300 to communicate by wired or wireless communication. Communication interface 320 may include one or more ports for receiving data, including ports for removable memory. Communication interface 320 may be configured to allow for network based communications including but not limited to LAN, WAN, Wi-Fi, etc.

Display 325 of device 300 may be configured to display one or more notifications associated with a detected container, and graphical elements associated with detection of one or more markers.

Marker detector 330 of device 300 includes one or more elements for detecting markers. In one embodiment, marker detector 330 may include optical detection elements (e.g., imaging device, digital camera, etc,) to optically detect one or more markers. In another embodiment, marker detector 330 may include one or more detection elements for detection and processing of data associated with barcode targets, such as a two-dimensional barcode, matrix arrays, and encoded patterns. In one embodiment, device 300 may include a plurality of marker detectors, for example, a marker detector for identifying a container, and one or more detectors for markers associated with a storage area.

In certain embodiments, device 300 may optionally include positioning sensor 335. Positioning sensor 335 may be configured to receive global positioning signals to determine position of a device 300. In certain embodiments, positioning data determined by positioning sensor 335 may be employed by processor 305 in addition to detected marker positions to determine the location of a container. In that fashion, multi-path error may be eliminated by corrected positioning data of device 300 based on detected marker data. In other embodiments, inertial sensors on shipping containers may provide output signals to determine position of a container.

Figure 4:
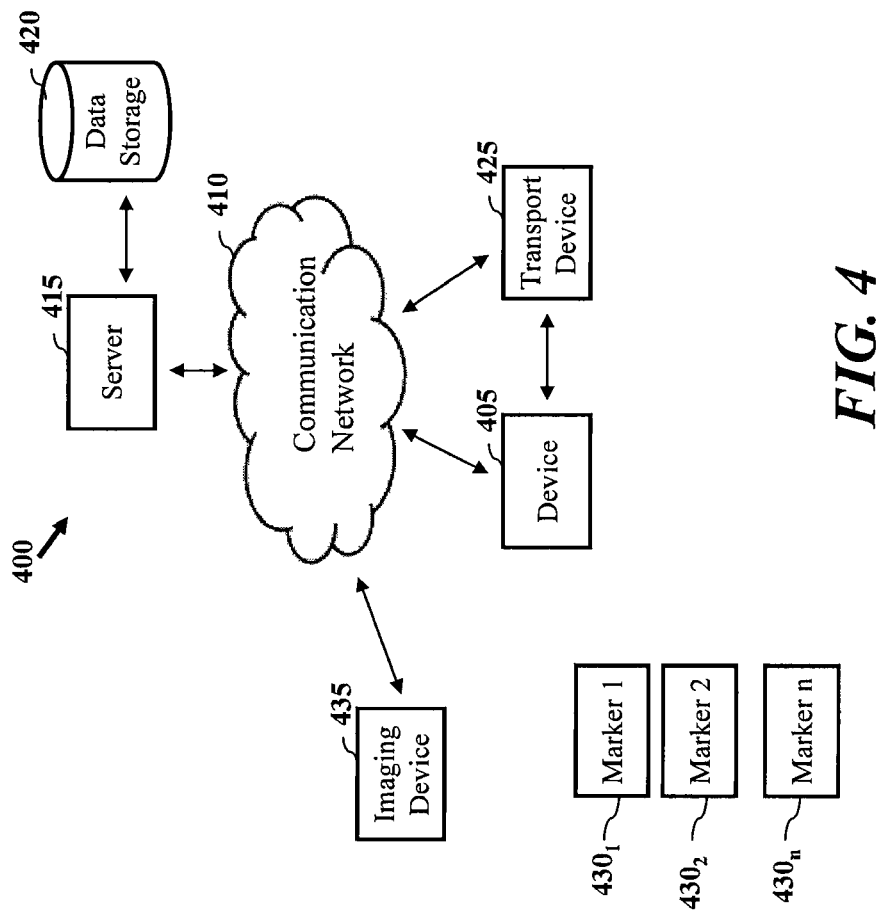
FIG. 4 depicts a simplified system diagram according to one of more embodiments.

Referring now to FIG. 4, a simplified system diagram is depicted according to one or more embodiments. System 400 may be employed for one or more of tracking, mapping and routing objects, such as shipping containers. In one embodiment, object tracking may be based on one or more markers positioned in a particular area, such as a storage facility, port, shipping area, etc. The markers of system 400 may provide location, identification and other information that may be used to track shipping containers. In addition, markers of system 400 can be detected based on one of more of barcode scanning and RFID detection. System 400 can include one or more devices, such as device 405, which may be configured to detect one or more markers for providing position information and markers which identify shipping containers. According to one embodiment, device 405 may be configured to track one or more containers. In addition to storing data for one or more containers, device 405 may provide location data for one or more containers to server 415. Server 415 may be configured to store location data for one or more shipping containers and may be accessed to provide shipping container data by one or more devices. Although only one device is depicted in FIG. 4, it should be appreciated that system 400 may service a plurality of devices.

Communication network 410 may allow for one or more of wired and wireless communication and for network based communications including, but not limited to, LAN, WAN, Wi-Fi, etc. Devices 405, 425 and 435 of FIG. 4 may be configured to connect to server 415 via communication network 410, which may include wired and/or wireless components. Although system 400 is described above as having a single server, it may be appreciated that system include a plurality of servers. Data storage unit 425 may relate to a database for storage of container data including position/location data, markers detected, time for detection of each marker, etc.

Device 405 may be configured for network communication with server 415 via communication network 410. Server 415 may be configured to receive and provide location data for one or more containers. Container location and information may be stored by data storage unit 430, which may be accessed by one or more devices.

In certain embodiments, device 405 may additionally be configured to provide location data for one or more containers to another device, such as transport device 425. Transport device 425 may relate to one or more of a transporting vehicle, crane, lifting device or other machinery for positioning a container. Transport device 425 may employ location data of a shipping container for container retrieval, container routing and container delivery.

According to one embodiment, device 405 may be configured to detection one or more markers, such as one or more of markers $430_{1-n}$. Markers $430_{1-n}$ may relate to one or more of barcode targets and RFID targets. According to another embodiment, system 400 may include imaging device 435 which may be configured to detection one or more of markers $430_{1-n}$. In certain embodiments, imaging device 435 may be configured to detect information to identify a container. In one embodiment, imaging device 435 may be positioned within a storage facility to detect shipping containers during transport. Imaging device 435 can communicate with server 415 via communication network 410 to provide updates of shipping container movement within a storage facility.

In certain embodiments, server 415 may be associated with a particular storage area, such as a port, for storing data associated with shipping containers of the port. In other embodiments, server 415 may be configured to provide access to data for a plurality of storage areas, such as multiple ports. Server 415 and data storage unit 420 may be accessed by one or more devices, such as computing devices and even computing devices remote to a particular storage facility for tracking a shipping container.

Figure 5:
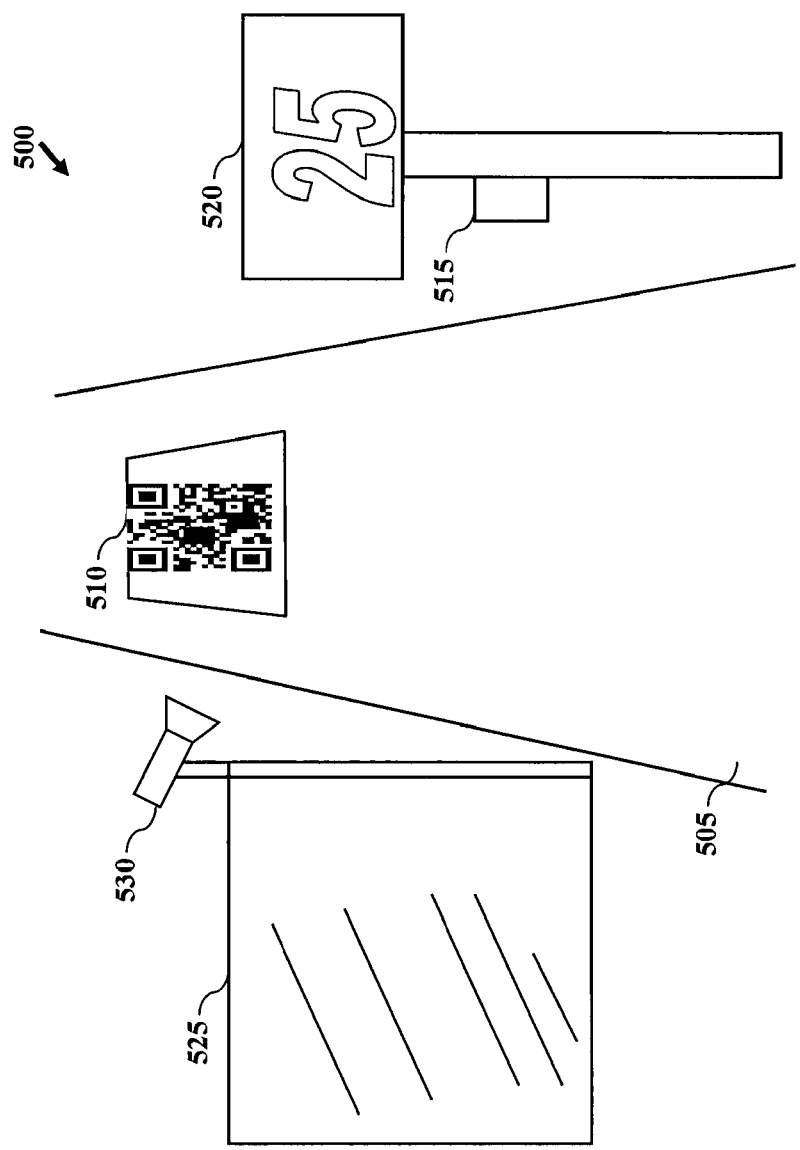
FIG. 5 depicts a graphical representation of markers according to one or more embodiments.

Referring now to FIG. 5, a graphical representation is depicted of markers according to one or more embodiments. FIG. 5 depicts area 500 which may relate to a portion of a storage facility (e.g., area 100). Area 500 includes pathway 505 (e.g., path 110) which may be employed by one or more devices or machines for transporting a container. According to one embodiment, pathway 505 may include one or more markers, such as marker 510, to provide position data. Marker 510 may include one or more of a two-dimensional barcode, matrix pattern or encoded patterns that may be detected by one or more of optical detection and barcode scanning.

According to another embodiment, markers may be associated with structures near pathway 510, such as marker 515 on signpost 520. Marker 515 may include an RFID device which may be detected by a device, such as a transporter when passing sign post 520. Each of markers 510 and 515 may include encoded position data and an identification of the marker which may be stored with a data record for a container.

According to another embodiment, one or more imaging devices may be provided to detect and image containers traveling via pathway 505. As depicted in FIG. 5, area 500 includes structure 525, depicted as a fence, and imaging device 530. Imaging device 530 may relate to one or more of a digital camera and optical scanning device. Imaging device 530 may be configured to communicate with a transport device, server, and marker detection device according to one or more embodiments.

Referring now to FIGS. 6A-6B, processes are depicted for tracking a container according to one or more embodiments. Referring first to FIG. 6A, process 600 may be initiated by detecting a container at block 605. In one embodiment, a device, such as a control device of a container transport machine may include one or more sensors, for optical imaging and/or RFID detection to identify containers and markers. Process 600 may proceed with detection of a marker at block 610. Detection of a container at block 610 may be based on optical imaging and/or RFID data of a marker. In certain embodiments it may be advantageous to update location of a container based on detection of a marker. In other instances, such as when the marker is associated with a pick-up location of the container, updating location of the container may not be necessary. In other embodiments, it may be beneficial to upload location of a plurality of markers or when the container reaches a storage location. Process 600 includes determining time of detection at block 611 for the detected marker. The determined time of detection may be stored in association with position data of the marker. In some embodiments, time of detection data may be employed to determine speed, average speed and/or estimated delivery of an object, such as a container.

At decision block 615, a check is determined whether or not to update location data for the container. When the location data is to be updated (e.g., "YES" path out of decision block 615), a data record for the container may be updated at block 620. When the location data is not to be updated (e.g., "NO" path out of decision block 615), process 600 may proceed to decision block 625.

At decision block 625, a check is determined whether or not detection of additional markers is required. For example, detection of a marker of a bay or storage area where the shipping container is to be delivered may notify a device that additional marker measurements are not required. The check at decision block 625 may be based on a predetermined period of time, lack of container movement, or detection of a marker when the container has reached a storage position. When the additional markers are to be detected (e.g., "YES" path out of decision block 625), process 600 may proceed to block 610. When the marker detection is complete (e.g., "NO" path out of decision block 625), the device may determine final location of the container at block 630. The device may update the data record for the container at block 635.

According to one embodiment, detecting a final or terminal location at block 630 may include detecting one or more attributes of the container position. Referring now to FIG. 6B, process 650 may be initiated by scanning a slot, bay or storage location for the container (e.g., bay 145). According to another embodiment, the device may additionally scan a marker of a neighboring container. Identification of a neighboring container may be employed to verify that a delivered container is in a correct location. At block 665, the data record for the delivered container may be updated. Updating the data record may including identifying the position of the delivered container and also identify the container position within a storage location, such as a level, position, height, etc. Such information can be used when transporting for scheduling and/or receiving a container.

Referring now to FIG. 7, a process is depicted for outputting container location information according to one or more embodiments. Process 700 may be performed by a controller of a device, such as a guidance controller or user interface of a container transport device. Process 700 may be initiated by detecting a container at block 705. The device may display location of the device at block 710, wherein the device location may be based on a data record stored for the container and/or device. In another embodiment, a device may determine location based on global positioning data received by the device.

At block 715, the control device may detect a marker. Marker detection may be based on one or more of imaging of a barcode target and detection of a marker by RFID. Based on the detected marker the control device may update the container location at block 720. Updating the container location at block 720 may additionally including updating stored data for the container to include the detection time of a marker, such as the marker detected at block 715. At block 725, the location data for the container may be transmitted to a server.

Referring now to FIG. 8, a graphical representation is depicted of an exemplary user interface of a control device according to one or more embodiments. User interface 800 may be displayed by a control device during transportation of a container. User interface 800 may relate to a display window of the control device. As depicted in FIG. 8, user interface 800 includes a graphical representation 805 identifying a container, graphical representation of a delivery address 810, and turn directions 815. Graphical representation 805 of a container may include display of a container identification number.

Figure 9B:
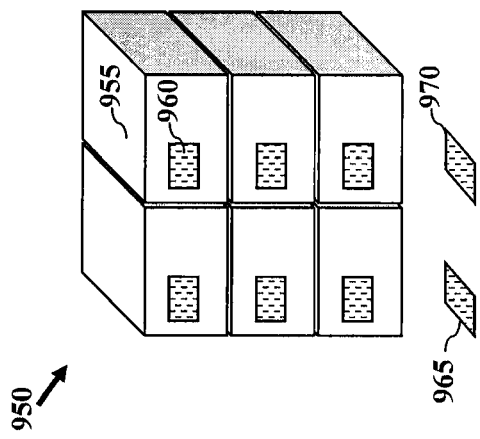
FIGS. 9A-9B depict graphical representations of objects according to one or more embodiments.
Figure 9A:
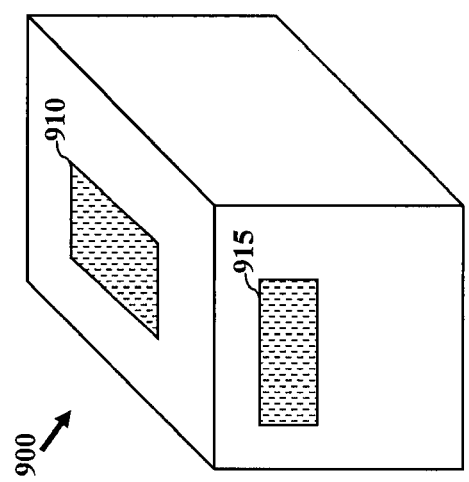

Referring now to FIGS. 9A-9B, graphical representations are depicted of containers according to one or more embodiments. Referring first to FIG. 9A, a graphical representation is depicted of container 900 which may be a shipping container. As depicted in FIG. 9A, one or more regions of container 900 may include markers 910 and 915. Markers 910 and 915 may be detected based on optical imaging to detect an encoded identification number. According to another embodiment, markers 910 and 915 may relate to a region an RFID marker is located. Scanning of the RFID marker may be used to identify a container by a device.

Referring now to FIG. 9B, a graphical representation is depicted of a stack of containers. Container stack 950 includes a plurality of containers. Each container may be identified by one or more markers. For example, container 955 includes marker 960. According to another embodiment, each container may be positioned in a slot or bay, wherein the slot or bays are associated with static markers, such as marker 965 and marker 970.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for tracking an object, the method comprising:
   with a carrier device configured to transport the object, sensing identification information for the object stored in an object identification tag associated with the object;
   while transporting the object with the carrier device, sensing, with the carrier device, a marker which identifies a location of the marker;
   with the carrier device, determining a time of sensing the marker;
   with the carrier device, storing, in a data record for the object, position data for the object based on the location identified by the marker and storing the time of sensing the marker in the data record for the object; and
   outputting, by the carrier device, the position data for the object.

2. The method of claim 1, wherein the object is a shipping container.

3. The method of claim 1, wherein the object is one or more of a container, rail car, tractor trailer, car hauler, transport container, and vehicle.

4. The method of claim 1, wherein the object identification tag is a barcode target including at least one of a two-dimensional barcode, a matrix code and an encoded pattern.

5. The method of claim 1, wherein the object identification tag is a radio frequency identification (RFID) tag of the object.

6. The method of claim 1, wherein detecting a marker includes detecting a barcode target, wherein location data of the marker is encoded in the barcode target.

7. The method of claim 1, wherein detecting a marker includes detecting a radio frequency identification (RFID) tag, wherein location data of the marker is encoded in the RFID tag.

8. The method of claim 1, wherein detecting a marker includes detecting one or more of a ground marker, pathway marker, and structure including a marker.

9. The method of claim 1, further comprising determining to detect additional markers based on at least one of time, object movement and object position.

10. The method of claim 1, wherein determining location data of the marker includes decoding location data encoded in the marker.

11. The method of claim 1, wherein storing position data includes storing the location data associated with the marker in an electronic record for the object.

12. The method of claim 1, wherein outputting the position data for the object includes one or more of transmitting the position data to a server and displaying the position data by the carrier device.

13. The method of claim 1, further comprising updating a display of a controller of the carrier device based on the position data for the object, wherein the display is updated for one or more of tracking scheduling, mapping and routing the object.

14. The method of claim 1, wherein the marker stores position data including at least one of location coordinates, Global Navigation Satellite Systems (GNSS) position data, surveying data and global position data.

15. A carrier device configured for object tracking comprising:
- a display;
- a detector configured to detect a marker during transport of an object by the carrier device; and
- a processor coupled to the display and the detector, the processor configured to:
  - receive data identifying an object based on information for the object stored in an object identification tag associated with the object,
  - receive information identifying a location of the detected marker;
  - control storage of position data for the object based on the location of the detected marker and the time of detection of the detected marker in a data record for the object; and
  - control output of position data for the object.

16. The device of claim 15, wherein the object is a shipping container.

17. The device of claim 15, wherein the object is one or more of a container, rail car, tractor trailer, car hauler, transport container, and vehicle.

18. The device of claim 15, wherein the object identification tag is a barcode target including at least one of a two-dimensional barcode, a matrix code and an encoded pattern.

19. The device of claim 15, wherein the object identification tag is a radio frequency identification (RFID) tag of the object.

20. The device of claim 15, wherein detecting a marker includes detecting a barcode target, wherein location data of the marker is encoded in the barcode target.

21. The device of claim 15, wherein detecting a marker includes detecting a radio frequency identification (RFID) tag, wherein location data of the marker is encoded in the RFID tag.

22. The device of claim 15, wherein detecting a marker includes detecting one or more of a ground marker, pathway marker, and structure including a marker.

23. The device of claim 15, further comprising determining to detect additional markers based on at least one of time, object movement and object position.

24. The device of claim 15, wherein determining location data of the marker includes decoding location data encoded in the marker.

25. The device of claim 15, wherein storing position data includes storing the location data associated with the marker in an electronic record for the object.

26. The device of claim 15, wherein outputting the position data for the object includes transmitting the position data to a server.

27. The device of claim 15, wherein outputting the position data for the object includes displaying the position data by the device.

28. The device of claim 15, wherein the processor is further configured to update the display based on the position data for the object, wherein the display is updated for one or more of tracking scheduling, mapping and routing the object.

29. The device of claim 15, wherein the processor is further configured to output the location data including transmitting the location data to a transport device.

30. The device of claim 15, wherein the marker stores position data including at least one of location coordinates, Global Navigation Satellite Systems (GNSS) position data, surveying data and global position data.

31. A method for tracking an object, the method comprising the acts of:
- detecting an object, by a carrier device, based on detection of an object identification tag;
- sensing a marker during transport of the object, wherein detection of the marker includes determining location data of the marker, and determining a time of detection for the marker, by the device, wherein determining location data of the marker includes decoding location data encoded in the marker;
- storing, by the device, position data for the object based on the location data of the marker and the time of detection for the marker in a data record for the object; and
- outputting, by the device, the position data for the object.

32. A method for tracking an object, the method comprising the acts of:
- detecting an object, by a carrier device, based on detection of an object identification tag;
- acquiring a global position, by the carrier device, wherein the global position is acquired by a positioning sensor on the carrier device;
- storing, by the carrier device, position data for the object based on the global position in a data record for the object;
- detecting a marker during transport of the object, wherein the marker is associated with a fixed position, and wherein detection of the marker includes determining location data of the marker and determining a time of detection for the marker, by the carrier device;
- updating, by the carrier device, position data for the object based on the location data of the marker and the time of detection for the marker in the data record for the object; and
- outputting, by the carrier device, the updated position data for the object.

* * * * *